United States Patent
Moeller

(10) Patent No.: US 7,616,794 B2
(45) Date of Patent: Nov. 10, 2009

(54) SYSTEM AND METHOD FOR AUTOMATIC BONE EXTRACTION FROM A MEDICAL IMAGE

(75) Inventor: Thomas Moeller, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 643 days.

(21) Appl. No.: 11/036,439

(22) Filed: Jan. 14, 2005

(65) Prior Publication Data
US 2005/0163358 A1 Jul. 28, 2005

Related U.S. Application Data

(60) Provisional application No. 60/539,284, filed on Jan. 26, 2004.

(51) Int. Cl.
G06K 9/34 (2006.01)
G06K 9/42 (2006.01)
G06K 9/44 (2006.01)
G06K 9/00 (2006.01)

(52) U.S. Cl. .................. 382/128; 382/130; 382/131; 382/132; 382/173; 382/257

(58) Field of Classification Search ............... 382/130, 382/131, 128, 190, 213, 132, 154, 173, 257
See application file for complete search history.

(56) References Cited

U.S. PATENT DOCUMENTS

| | | | | |
|---|---|---|---|---|
| 6,021,213 A | * | 2/2000 | Helterbrand et al. | 382/128 |
| 6,047,090 A | * | 4/2000 | Makram-Ebeid | 382/128 |
| 7,123,760 B2 | * | 10/2006 | Mullick et al. | 382/131 |
| 7,177,453 B2 | * | 2/2007 | Suryanarayanan et al. | 382/128 |
| 7,295,691 B2 | * | 11/2007 | Uppaluri et al. | 382/130 |

(Continued)

FOREIGN PATENT DOCUMENTS

EP 1225542 A2 * 7/2002

(Continued)

OTHER PUBLICATIONS

Zoroofi et al., "Automated Segmentation of Acetabulum and Femoral Head From 3-D CT Images", Dec. 2003, IEEE Transactions on Information Technology in Biomedicine, vol. 7, No. 4 pp. 329-343.*

(Continued)

Primary Examiner—John B Strege
(74) Attorney, Agent, or Firm—Donald B. Paschburg; F. Chau & Associates, LLC

(57) ABSTRACT

A system and method for automatic bone extraction from a medical image is provided. A method for automatically extracting a bone from a medical image, comprises: performing a thresholding on the image in an intensity range of the bone to generate a first bit mask; eroding the first bit mask to remove connections between blood vessels and the bone to generate a second bit mask; performing a region growing on the second bit mask starting from a seed point within the intensity range to separate the bone from unconnected blood vessels and to generate a third bit mask; dilating the third bit mask to generate a fourth bit mask; and performing a region growing on the fourth bit mask starting from the seed point within the intensity range to generate a fifth bit mask representing the bone.

19 Claims, 6 Drawing Sheets

U.S. PATENT DOCUMENTS

2003/0099386 A1* 5/2003 Schneider et al. ............ 382/130

FOREIGN PATENT DOCUMENTS

WO          WO 02085211 A2 * 10/2002

OTHER PUBLICATIONS

Fan et al., "Automatic Image Segmentation by Integrating Color-Edge Extraction and Seeded Region Growing", Oct. 2001, IEEE Transactions on Image Processing, vol. 10, No. 10, pp. 1454-1466.*

Revol-Muller et al. 'Automated 3D region growing algorithm governed by an evaluation function', Sep. 2000, Proceeding 200 International Conference on Image Processing, vol. 3, pp. 440-443.*

Fiebich et al., "Automatic Bone Segmentation Technique for CT Angiographic Studies", 1999, Journal of Computer Assisted Tomography, vol. 23 No. 1, pp. 155-161.*

Fiebich et al., "Automatic Bone Segmentation Technique for CT Angiographic Studies", Journal of Computer Assisted Tomography, New York, NY, US, vol. 23, No. 1, Jan. 1999, pp. 155-161.

Kim et al., "Automatic Segmentation of A Brain Region in MR Images Using Automatic Thresholding and 3D Morphological Operations", IEICE Transactions on Information and Systems, Institute of Electronics Information and Comm. Eng. Tokyo, JP, vol. E85-D, No. 10, Oct. 2002, pp. 1698-1709.

Alyassin et al., "Semi-automatic bone removal technique from CT angiography data". Proceedings of the SPIE, Bellingham, VA, US, vol. 4322, 2001, pp. 1273-1283.

Saha et al., "Automatic bone-free rendering of cerebral aneurysms via 3D-CTA", Proceedings of the SPIE—The International Society for Optical Engineering SPIE—Int. Soc. Opt. Eng. USA, vol. 4322, 2001, pp. 1264-1272.

Silva J.S., Silva A., Santos B.S.: "Lung segmentation methods in x-ray CT images"; Proceedings of $5^{th}$ Ibero-American Symposium On Pattern Recognition—SIARP'2000. Lisbon, Portugal: APRP—Portuguese Association for Pattern Recognition; 2000, pp. 583-598.

Fiebich M et al.: Automatic Bone Segmention Technique for CT Angiographic Studies Journal of Computer Assisted Tomography, New York, NY, US, vol. 23, mo. 1, Jan. 1999, pp. 155-161 (retrieved from http://ovidsp.tx.ovid.com/).

* cited by examiner

SYSTEM AND METHOD FOR AUTOMATIC BONE EXTRACTION FROM A MEDICAL IMAGE This application claims the benefit of U.S. Provisional Application No. 60/539,284, filed Jan. 26, 2004, a copy of which is herein incorporated by reference.

BACKGROUND OF THE INVENTION

1. Technical Field

The present invention relates to medical image analysis, and more particularly, to a system and method for automatically extracting a bone structure from a three-dimensional (3D) medical image.

2. Discussion of the Related Art

Current three-dimensional (3D) volume rendering techniques such as maximum intensity projection are used by medical practitioners to extract high-intensity structures such as bones from volumetric data acquired during computed tomography (CT) scans. These techniques, however, require manual input to remove a region of interest (ROI) such as a bone structure that obscures vascular structures from such data.

One technique for extracting an ROI from, for example, a stack of slice-based medical image data is to manually mark areas associated with the region on each slice of the image data. This technique, however, is time consuming and sometimes inaccurate, as a medical practitioner must manually mark each area region. Another technique used to extract ROIs is to combine an automatic path detection technique such as Livewire with interpolation. Yet another technique for extracting ROIs is to perform a region growing on an ROI defined by a group of connected blood vessels whose intensity is within a given range.

These techniques, however, do not extract portions of an ROI where, for example, bone structures touch blood vessels due to overlapping intensity ranges. Moreover, to remove such connections time consuming manual corrections to the image data such as the placing of blockers must take place before reprocessing the image.

Although automatic image segmentation techniques have been developed to remove connections between bones and blood vessels, they are not suitable for large amounts of data or high-speed analysis. Accordingly, there is a need for an image analysis technique that can extract unwanted objects from medical image data without manual interaction and that operates at a high speed.

SUMMARY OF THE INVENTION

The present invention overcomes the foregoing and other problems encountered in the known teachings by providing a system and method for automatically extracting a bone structure from a medical image.

In one embodiment of the present invention, a method for automatically extracting a bone structure from a medical image comprises: performing a thresholding on each voxel of the medical image in an intensity range of the bone structure to generate a first bit mask; eroding the first bit mask to remove connections between blood vessels and the bone structure to generate a second bit mask, wherein the connections are within the intensity range; performing a region growing on the second bit mask starting from a seed point by growing voxels into neighboring voxels within the intensity range to separate the bone structure from unconnected blood vessels and to generate a third bit mask; dilating the third bit mask to recover a surface area of the third bit mask to generate a fourth bit mask; and performing a region growing on the fourth bit mask starting from the seed point by growing into neighboring voxels within the intensity range to generate a fifth bit mask representing the bone structure.

The medical image is of an anatomical part. The intensity range is one of determined by selecting a brightness level of the bone structure, derived from an area surrounding the seed point, and preset. The seed point is obtained by a user selecting a point representing an object to be removed from the medical image. The object to be removed from the medical image is the bone structure.

The method further comprises performing a volume rendering technique on the fifth bit mask to extract the bone structure from the medical image. The volume rendering technique is one of a maximum intensity projection, opacity rendering, and shaded opacity rendering. The medical image is acquired by one of a computed tomography (CT) and, helical CT imaging technique.

In another embodiment of the present invention, a system for automatic bone extraction from a medical image comprises: a memory device for storing a program; a processor in communication with the memory device, the processor operative with the program to: perform a thresholding on each voxel of the medical image in an intensity range of the bone to generate a first bit mask; erode the first bit mask to remove connections between blood vessels and the bone structure to generate a second bit mask, wherein the connections are within the intensity range; perform a region growing on the second bit mask starting from a seed point by growing voxels into neighboring voxels within the intensity range to separate the bone from unconnected blood vessels and to generate a third bit mask; dilate the third bit mask to recover a surface area of the third bit mask to generate a fourth bit mask; and perform a region growing on the fourth bit mask starting from the seed point by growing into neighboring voxels within the intensity range to generate a fifth bit mask representing the bone.

The medical image is of an anatomical part. The intensity range is one of determined by selecting a brightness level of the bone, derived from an area surrounding the seed point, and preset. The seed point is obtained by a user selecting a point representing an object to be removed from the medical image. The object to be removed from the medical image is the bone.

The processor is further operative with the program code to perform a volume rendering technique on the fifth bit mask to extract the bone from the medical image. The volume rendering technique is one of a maximum intensity projection, opacity rendering, and shaded opacity rendering. The medical image is acquired by one of a CT and helical CT imaging technique.

In yet another embodiment of the present invention, a computer program product comprising a computer useable medium having computer program logic recorded thereon for extracting a bone structure from a medical image, the computer program logic comprises: program code for performing a thresholding on each voxel of the medical image in an intensity range of the bone structure to generate a first bit mask; program code for eroding the first bit mask to remove connections between blood vessels and the bone structure to generate a second bit mask, wherein the connections are within the intensity range; program code for performing a region growing on the second bit mask starting from a seed point by growing voxels into neighboring voxels within the intensity range to separate the bone structure from unconnected blood vessels and to generate a third bit mask; program code for dilating the third bit mask to recover a surface area of the third bit mask to generate a fourth bit mask; and program code for performing a region growing on the fourth bit mask starting from the seed point by growing into neighboring voxels within the intensity range to generate a fifth bit mask representing the bone structure.

In another embodiment of the present invention, a system for automatic bone extraction from a medical image comprises: means for performing a thresholding on each voxel of the medical image in an intensity range of the bone to generate a first bit mask; means for eroding the first bit mask to remove connections between blood vessels and the bone structure to generate a second bit mask, wherein the connections are within the intensity range; means for performing a region growing on the second bit mask starting from a seed point by growing voxels into neighboring voxels within the intensity range to separate the bone from unconnected blood vessels and to generate a third bit mask; means for dilating the third bit mask to recover a surface area of the third bit mask to generate a fourth bit mask; and means for performing a region growing on the fourth bit mask starting from the seed point by growing into neighboring voxels within the intensity range to generate a fifth bit mask representing the bone.

In a further embodiment of the present invention, a method for automatically extracting a bone structure from a medical image comprises: obtaining a seed point from the medical image; determining an intensity range of the bone structure; performing a region growing on a second bit mask to generate a third bit mask, wherein the region growing is performed from the seed points on voxels of the second bit mask within the intensity range and a distance from a surface of an object, wherein the object is defined by eroding a first bit mask of the voxels within the intensity range; and dilating the third bit mask by applying a dilation filter to voxels within the intensity range to generate a fourth bit mask and performing a region growing on the fourth bit mask to generate a fifth bit mask representing the bone structure.

In another embodiment of the present invention, a method for automatically extracting a bone from a slice-based three-dimensional (3D) medical image comprises: obtaining a bone seed point from the medical image; determining an intensity range of the bone; performing a binary thresholding on each voxel of the medical image in the intensity range to generate a first bit mask; applying a morphological erosion filter to the first bit mask to remove connections between blood vessels and the bone to generate a second bit mask, wherein the connections are within the intensity range; performing a region growing on the second bit mask starting from the seed point by growing voxels within the intensity range to separate the bone from unconnected blood vessels and to generate a third bit mask; applying a dilation filter to the third bit mask to recover a surface area of the third bit mask to generate a fourth bit mask; performing a region growing on the fourth bit mask starting from the seed point within the intensity range to generate a fifth bit mask representing the bone; and performing a volume rendering technique on the fifth bit mask to extract the bone from the medical image.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
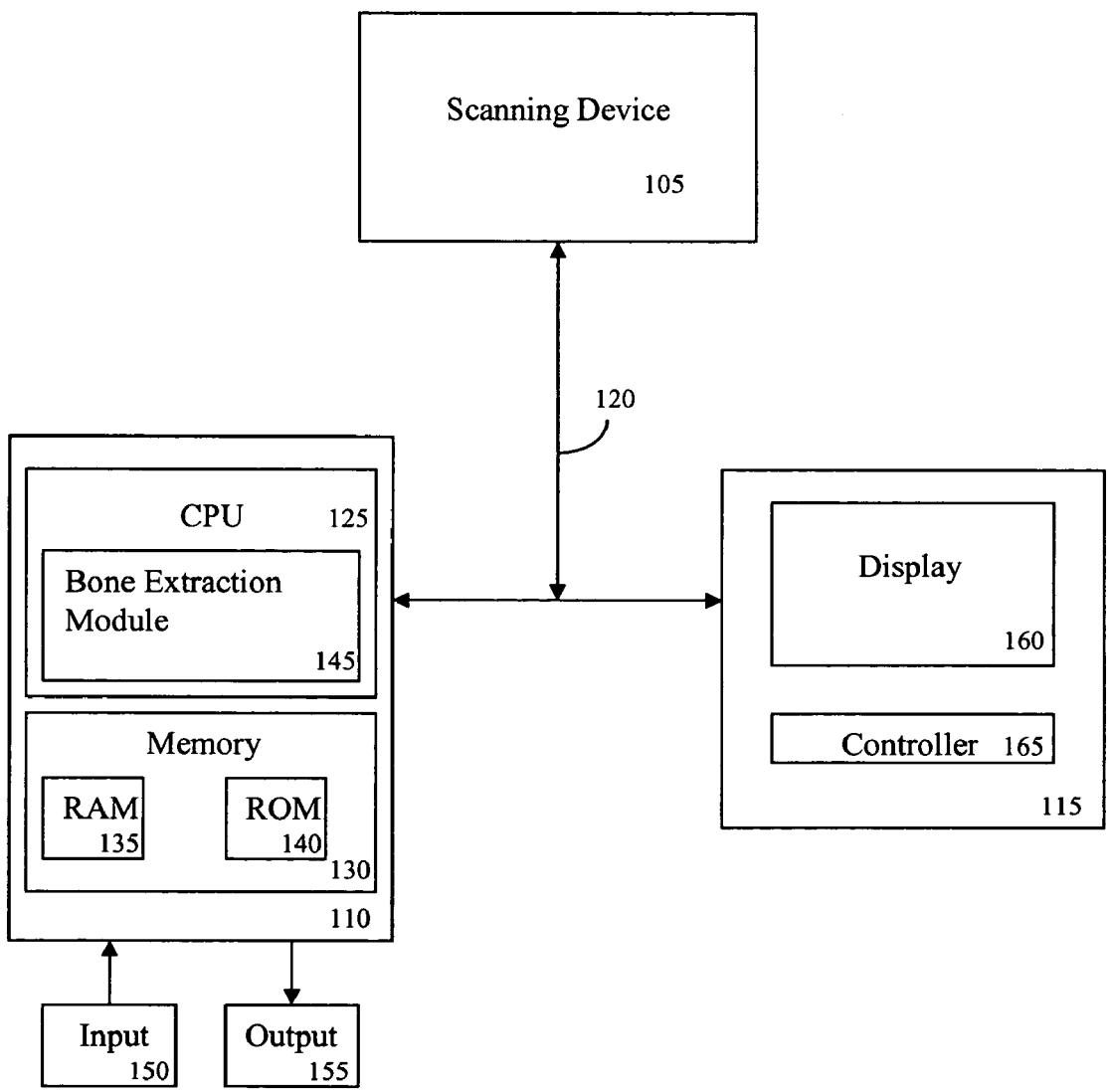
FIG. 1 is a block diagram of a system for automatic bone extraction from a medical image according to an exemplary embodiment of the present invention.

FIG. 1 is a block diagram of a system 100 for automatic bone extraction from a medical image according to an exemplary embodiment of the present invention. As shown in FIG. 1, the system 100 includes, inter alia, a scanning device 105, a personal computer (PC) 110 and an operator's console 115 connected over, for example, an Ethernet network 120. The scanning device 105 may be a computed tomography (CT) or helical CT imaging device.

The PC 110, which may also be a portable or laptop computer includes a central processing unit (CPU) 125 and a memory 130, which are connected to an input 150 and an output 155. The CPU 125 includes a bone extraction module 145 that includes one or more methods for extracting a bone or a portion of a bone from a medical image.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, printer, etc.

The operation of the system 100 is controlled from the operator's console 115, which includes a controller 165, for example, a keyboard, and a display 160, for example, a CRT display. The operator's console 115 communicates with the PC 110 and the scanning device 105 so that image data collected by the scanning device 105 can be reconstructed into a stack of two-dimensional (2D) slices and rendered as three-dimensional (3D) data by the PC 110 and viewed on the display 160. It is to be understood that the PC 110 can be configured to operate and display information provided by the scanning device 105 absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160 using, for example, a 3D graphics card. More specifically, the image rendering system may be an application that provides 2D/3D rendering and visualization of image data, and which executes on a general purpose or specific computer workstation. The PC 110 may also include an image rendering system/tool/application for processing digital image data of an acquired image dataset to generate and display 2D and/or 3D images.

As shown in FIG. 1, the bone extraction module 145 is also used by the PC 110 to receive and process digital image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2:
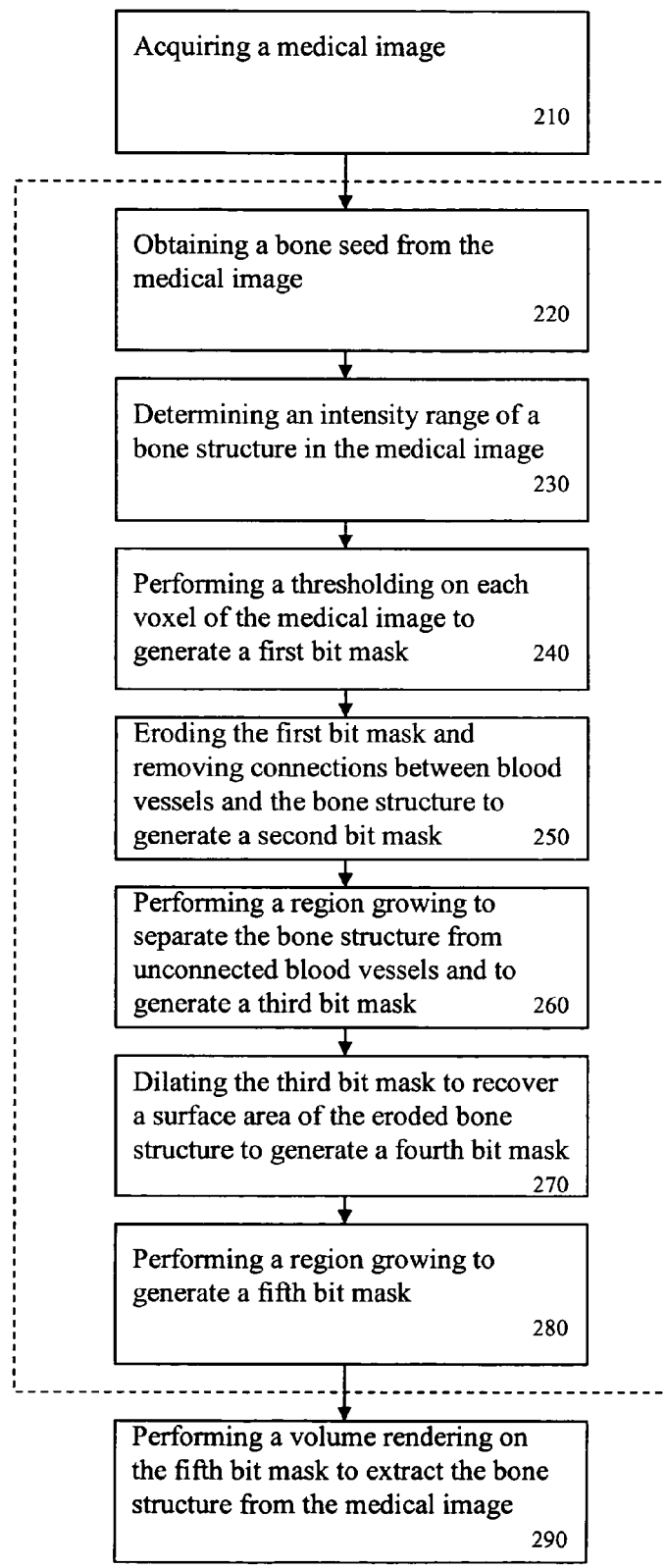
FIG. 2 is a flowchart illustrating a method for automatically extracting a bone structure from a medical image according to an exemplary embodiment of the present invention.

FIG. 2 is a flowchart illustrating a method for automatically extracting a bone structure from a medical image according to an exemplary embodiment of the present invention. As shown in FIG. 2, a medical image such as a slice-based medical image is acquired from, for example, an anatomical part (step 210). This is accomplished by using the scanning device 105, in this example a CT scanner, which is operated at the operator's console 115, to scan the anatomical part thereby generating a series of 2D images associated with the part. The 2D images of the anatomical part may then be converted or transformed into a 3D rendered image.

After acquiring the image, a seed, for example a bone seed, is obtained from the image (step 220). The bone seed is a 3D point that will serve as a seed point for region growing operations. The bone seed may be obtained manually by a medical practitioner using, for example, a mouse to select a point in a portion of the image on the display 160. The selected portion of the image may be an object such as a bone or a portion of a bone (e.g., a bone structure) that the medical practitioner wants to extract from the image.

The bone seed or a set of related bone seed points may also be obtained automatically by, for example, presetting an intensity threshold of the image to a level typically used to identify a high-density bone structure. For example, by setting the threshold to a value of 1200 Hounsfield units, which typically represents a high density bone structure, all voxels in the image with a value above this threshold could be used as seed points to extract a bone from the image. Thus, eliminating the need for manual selection of the seed point.

Upon obtaining the bone seed, an intensity range of, for example the bone structure in the image, is determined (step 230). The intensity range may be determined manually by, for example, a user selecting a brightness level of the bone structure, or automatically by presetting the intensity range. The intensity range may also be determined by analyzing a volume histogram of the image to find a desired intensity range associated with an area surrounding the bone structure.

Figure 3A:
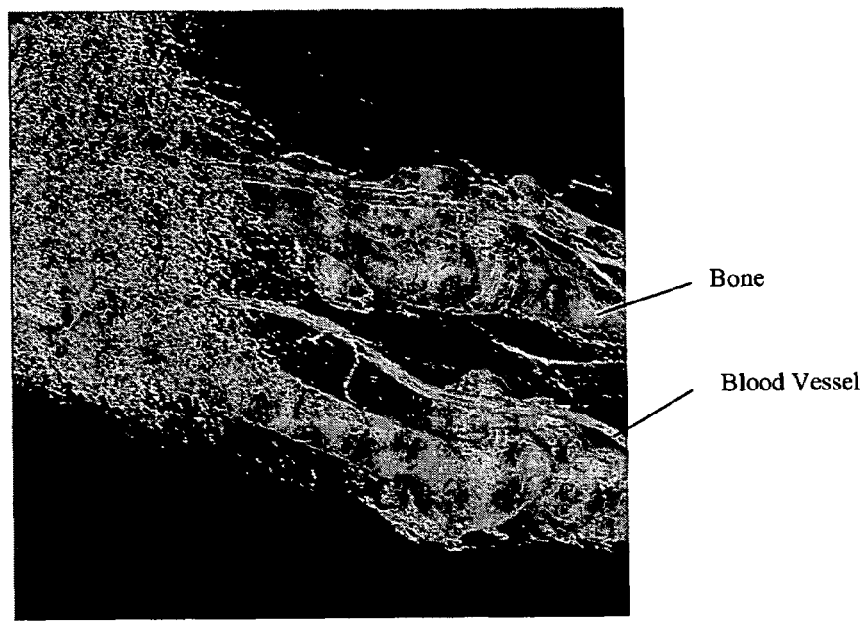
FIG. 3A illustrates a bit mask in a computed tomography (CT) angiography dataset created by performing step 240 of FIG. 2.

Once the bone seed and the intensity range of the bone structure are determined, a thresholding on each voxel of the image is performed (step 240). More specifically, a binary thresholding is performed on each voxel where its value (e.g., its gray value), which is represented by a zero or a one in a bit mask, is either below the selected threshold (e.g., its bit mask value is zero) or greater than or equal to the threshold (e.g., its bit mask value is one). Thus generating a first bit mask based on the binary threshold of the bone structure that includes, for example, contrast fluid enhanced blood vessels and organs. An example of a first bit mask that was generated using a CT angiography dataset of leg bones, which includes blood vessels surrounding the bones, is shown in FIG. 3A.

In the alternative, a binary region growing starting from the seed point or points can be performed in step 240. In doing so, voxels neighboring the seed points are represented by a one in a bit mask if their gray level value is greater than or equal to the selected threshold thus forming a joint region of ones in the bit mask. All other voxels that are disjoint or below the threshold are assigned a zero gray level value. Although performing a region growing in this step is computationally more expensive than performing a binary thresholding, the region growing does allow additional constraints to be applied such as mean, variance, or manually placed blockers.

Figure 3B:
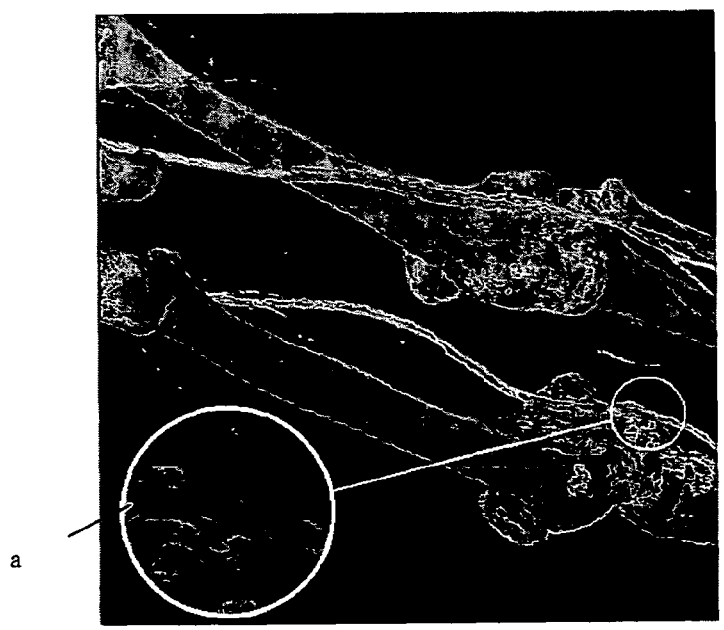
FIG. 3B illustrates an eroded bit mask in a CT angiography dataset created by performing step 250 of FIG. 2.

After generating the first bit mask, the first bit mask is eroded to remove connections between blood vessels, such as arteries, and the bone structure (step 250). More specifically, a morphological erosion filter is applied to the first bit mask to remove connections between blood vessels and the bone structure that are in the intensity range of the bone structure to generate a second (e.g., eroded) bit mask. An example of the second bit mask, which is an eroded version of the first bit mask of FIG. 3A, is shown in FIG. 3B. As can be observed from a zoomed in portion (a) of FIG. 3B, a connection between a blood vessel and a bone is removed.

The erosion filter modifies the first bit mask by, for example, applying a stencil/structuring element (e.g., a sphere or a cube) to all surface points of the image, which are marked voxels (e.g., voxels within intensity range of the bone structure), that also neighbor unmarked voxels, and unmarking all voxels covered by the structuring element. Thus, reducing the bone to its core structure and removing all connections between, for example, small contrast enhanced blood vessels and the bone thereby creating the second bit mask.

Subsequent to the erosion step 250, a region growing is performed to separate the bone structure from unconnected blood vessels (step 260). In particular, a region growing is performed within the second bit mask starting from the bone seed point or points to remove all regions that are disjoint from any of the bone seed points such as unconnected blood vessels and organs from the second bit mask to create a third bit mask.

Once the third bit mask is generated, it is dilated (e.g., expanded) to recover a surface area of the eroded third bit mask to create a fourth bit mask (step 270). More particularly, the voxels which were initially marked and then eroded, are re-marked thereby creating the fourth (e.g., estimated) bit mask of the bone structure. In other words, in step 270, a dilation filter modifies the third bit mask by applying a stencil/structuring element to all surface points, which are marked voxels that neighbor unmarked voxels, and marks all voxels covered by the structuring element thus expanding the core structure of the bone. The fourth bit mask of the bone structure may include, however, some image remnants from its surrounding area.

Subsequently, another region growing is performed to create a fifth bit mask (step 280). This is accomplished, for example, by starting the region growing from the bone seed point and then growing into neighboring voxels that are within the intensity range of the bone structure constrained by the fourth bit mask to create the fifth bit mask representing the bone structure.

Figure 4A:
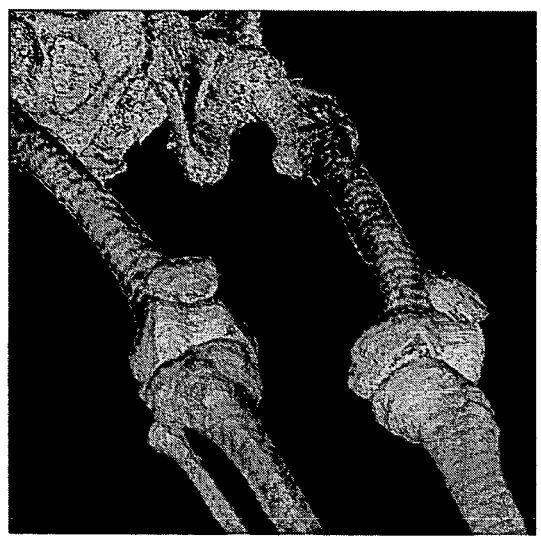
FIG. 4A illustrates a bit mask of a bone in a CT angiography dataset created by performing step 280 of FIG. 2.
Figure 4B:
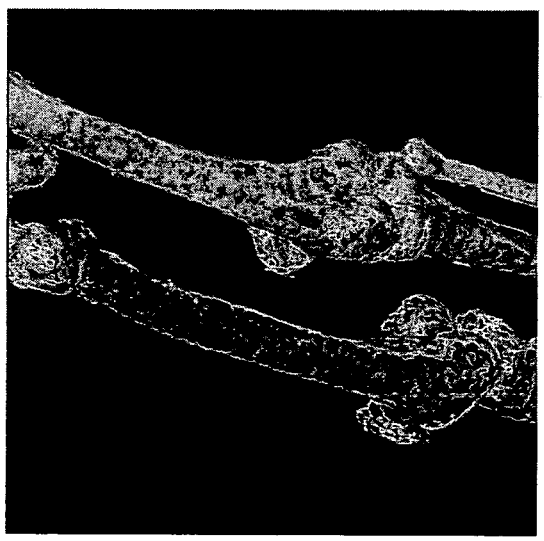
FIG. 4B illustrates another bit mask of a bone in a CT angiography dataset created by performing step 280 of FIG. 2.
Figure 5A:
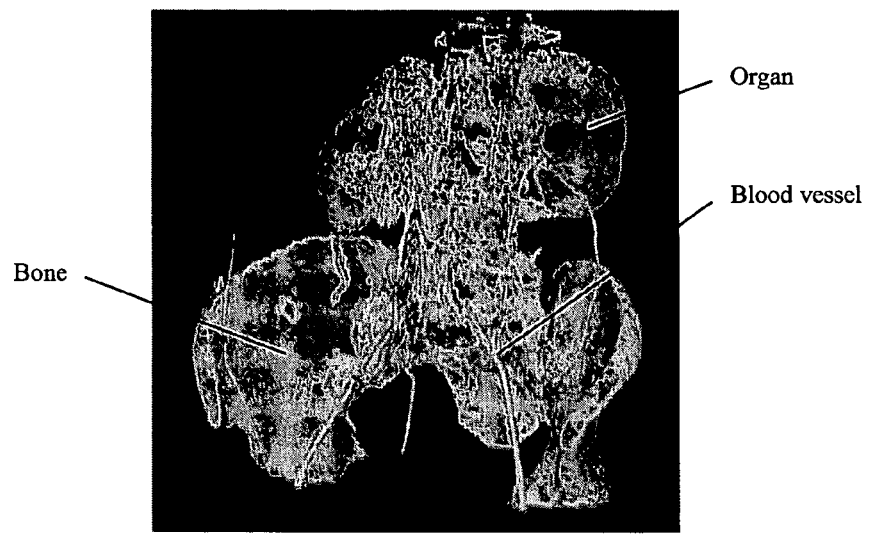
FIG. 5A illustrates a bit mask in a CT angiography dataset created by performing a conventional region growing algorithm.
Figure 5B:
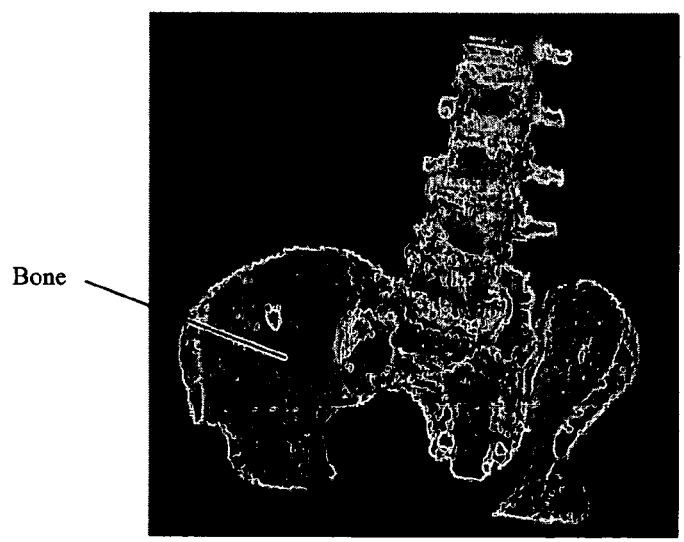
FIG. 5B illustrates a bit mask in a CT angiography dataset created by performing steps 220-280 of FIG. 2.

Examples of a fifth bit mask created in a CT angiography dataset are shown in FIGS. 4A and 4B. In particular, FIG. 4A illustrates a fifth bit mask created for a leg bone and FIG. 4B illustrates a fifth bit mask created for a rib bone. Yet another example of the fifth bit mask is shown in FIG. 5B which may be compared to a binary bit mask of FIG. 5A that was created using a conventional region growing algorithm. As can be observed from FIGS. 5A and 5B, the fifth bit mask has removed any organs or blood vessels that were attached the bone thus resulting in a clear representation of an abdomen bone structure, whereas the binary bit mask includes remnants such as organs and bloods vessels connected to the abdomen bone structure.

Figure 6A:
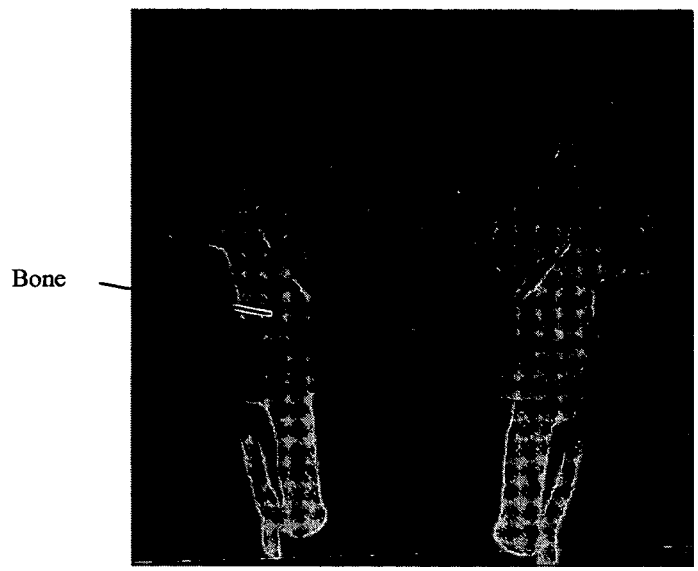
FIG. 6A illustrates a three-dimensional (3D) rendered image of a CT angiography dataset including a bone structure.
Figure 6B:
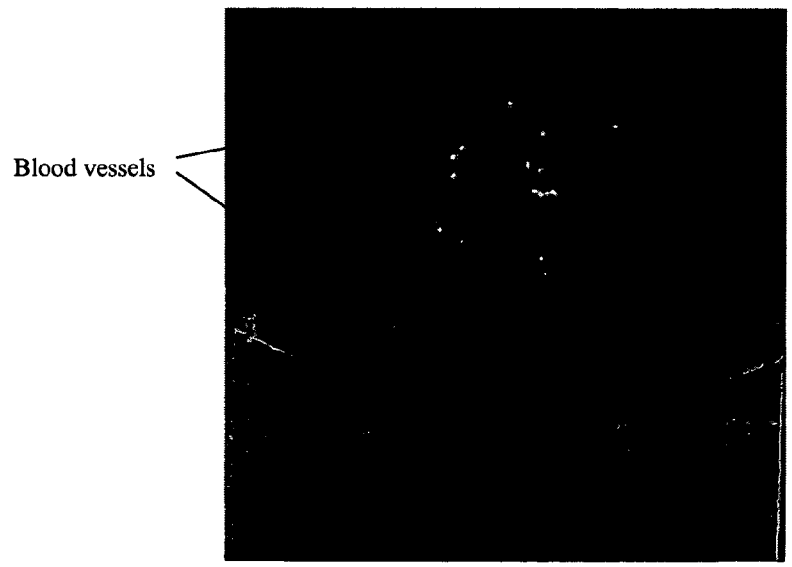
FIG. 6B illustrates a 3D rendered image of the CT angiography dataset of FIG. 6A excluding the bone structure created by performing steps 220-290 of FIG. 2.

The fifth bit mask resulting from step 280 can then be used to exclude the bone that it represents from a 3D visualization of the image. For example, a volume rendering technique such as maximum intensity projection, opacity rendering or shaded opacity rendering can be performed on the fifth bit mask to extract the bone structure from the image (step 290). Thus, resulting in a rendered image with a bone extracted therefrom as shown, for example, in FIG. 6B, which is unlike that of an image shown in FIG. 6A that was rendered using a conventional rendering technique and still displays a bone structure.

Thus, in accordance with an exemplary embodiment of the present invention, a bone structure or another unwanted object can be removed from a medical image so that a user can observe underlying image data such as blood vessels without manual interaction. Although, in some instances, manual interaction can take place such as when selecting an initial seed point or selecting the intensity range of a bone structure in the medical image, the remainder of the method steps discussed herein is automated. Moreover, the first two steps of the method where manual interaction can take place may also be automated thereby enabling seamless execution of the method steps. Thus, for example, a medical practitioner who desires to modify medical image data using the method in accordance with the present invention may simply select an icon on a display 160 to execute the method thereby removing unwanted objects that fall within a preset intensity range from the image data. On the other hand, the medical practitioner may select a seed point and the intensity range of the object or objects to be removed from the image and then select an icon on the display to execute the method.

It is to be understood that in an alternative embodiment of the present invention, multiple image processing steps can be combined into a single pass or step to further optimize the processing time of the method described above with reference to FIG. 2. For example, the processes that take place in steps 240-260 can be combined into a single region growing operation that starts from a bone seed point and that determines a joint region of voxels having a gray level above the threshold of a bone structure having a defined distance from a surface of an object derived from the size of an erosion structuring element. This creates the third bit mask. Similarly, the processes that take place in steps 270 and 280 can also be combined into a dilating operation to be performed on the third bit mask, if for example, voxels used to create the fifth bit mask are marked only if they are covered by a structuring element of the dilation filter and their gray level is above the threshold of the bone structure.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for automatically extracting a bone structure from a medical image, comprising:
   using a processor to carry out the steps of:
   performing a thresholding on each voxel of the medical image in an intensity range of the bone structure to generate a first bit mask;
   eroding the first bit mask to remove connections between blood vessels and the bone structure to generate a second bit mask, wherein the connections are within the intensity range;
   performing a region growing within the second bit mask starting from a seed point by growing voxels into neighboring voxels within the intensity range to separate the bone structure from unconnected blood vessels and to generate a third bit mask;
   dilating the third bit mask to recover a surface area of the third bit mask to generate a fourth bit mask; and
   performing a region growing within the fourth bit mask starting from the seed point by growing into neighboring voxels within the intensity range to generate a fifth bit mask representing the bone structure.

2. The method of claim 1, wherein the medical image is of an anatomical part.

3. The method of claim 1, wherein the intensity range is one of determined by selecting a brightness level of the bone structure, derived from an area surrounding the seed point, and preset.

4. The method of claim 1, wherein the seed point is obtained by a user selecting a point representing an object to be removed from the medical image.

5. The method of claim 4, wherein the object to be removed from the medical image is the bone structure.

6. The method of claim 1, further comprising:
using the processor to carry out the step of:
performing a volume rendering technique on the fifth bit mask to extract the bone structure from the medical image.

7. The method of claim 6, wherein the volume rendering technique is one of a maximum intensity projection, opacity rendering, and shaded opacity rendering.

8. The method of claim 1, wherein the medical image is acquired by one of a computed tomography (CT) and helical CT imaging technique.

9. A system for automatic bone extraction from a medical image, comprising:
a memory device for storing a program;
a processor in communication with the memory device, the processor operative with the program to:
perform a thresholding on each voxel of the medical image in an intensity range of the bone to generate a first bit mask;
erode the first bit mask to remove connections between blood vessels and the bone structure to generate a second bit mask, wherein the connections are within the intensity range;
perform a region growing within the second bit mask starting from a seed point by growing voxels into neighboring voxels within the intensity range to separate the bone from unconnected blood vessels and to generate a third bit mask;
dilate the third bit mask to recover a surface area of the third bit mask to generate a fourth bit mask; and
perform a region growing within the fourth bit mask starting from the seed point by growing into neighboring voxels within the intensity range to generate a fifth bit mask representing the bone.

10. The system of claim 9, wherein the medical image is of an anatomical part.

11. The system of claim 9, wherein the intensity range is one of determined by selecting a brightness level of the bone, derived from an area surrounding the seed point, and preset.

12. The system of claim 9, wherein the seed point is obtained by a user selecting a point representing an object to be removed from the medical image.

13. The system of claim 12, wherein the object to be removed from the medical image is the bone.

14. The system of claim 9, wherein the processor is further operative with the program code to:
perform a volume rendering technique on the fifth bit mask to extract the bone from the medical image.

15. The system of claim 14, wherein the volume rendering technique is one of a maximum intensity projection, opacity rendering, and shaded opacity rendering.

16. The system of claim 9, wherein the medical image is acquired by one of a computed tomography (CT) and helical CT imaging technique.

17. A computer readable storage medium storing instructions that, when executed by a computer, cause the computer to perform a method of extracting a bone structure from a medical image, the method comprising:
performing a thresholding on each voxel of the medical image in an intensity range of the bone structure to generate a first bit mask;
eroding the first bit mask to remove connections between blood vessels and the bone structure to generate a second bit mask, wherein the connections are within the intensity range;
performing a region growing within the second bit mask starting from a seed point by growing voxels into neighboring voxels within the intensity range to separate the bone structure from unconnected blood vessels and to generate a third bit mask;
dilating the third bit mask to recover a surface area of the third bit mask to generate a fourth bit mask; and
performing a region growing within the fourth bit mask starting from the seed point by growing into neighboring voxels within the intensity range to generate a fifth bit mask representing the bone structure.

18. A system for automatic bone extraction from a medical image, comprising:
means for performing a thresholding on each voxel of the medical image in an intensity range of the bone to generate a first bit mask;
means for eroding the first bit mask to remove connections between blood vessels and the bone structure to generate a second bit mask, wherein the connections are within the intensity range;
means for performing a region growing within the second bit mask starting from a seed point by growing voxels into neighboring voxels within the intensity range to separate the bone from unconnected blood vessels and to generate a third bit mask;
means for dilating the third bit mask to recover a surface area of the third bit mask to generate a fourth bit mask; and
means for performing a region growing within the fourth bit mask starting from the seed point by growing into neighboring voxels within the intensity range to generate a fifth bit mask representing the bone.

19. A method for automatically extracting a bone from a slice-based three-dimensional (3D) medical image, comprising:
using a processor to carry out the steps of:
obtaining a bone seed point from the medical image;
determining an intensity range of the bone;
performing a binary thresholding on each voxel of the medical image in the intensity range to generate a first bit mask;
applying a morphological erosion filter to the first bit mask to remove connections between blood vessels and the bone to generate a second bit mask, wherein the connections are within the intensity range;
performing a region growing within the second bit mask starting from the seed point by growing voxels within the intensity range to separate the bone from unconnected blood vessels and to generate a third bit mask;
applying a dilation filter to the third bit mask to recover a surface area of the third bit mask to generate a fourth bit mask;
performing a region growing within the fourth bit mask starting from the seed point within the intensity range to generate a fifth bit mask representing the bone; and
performing a volume rendering technique on the fifth bit mask to extract the bone from the medical image.

* * * * *

UNITED STATES PATENT AND TRADEMARK OFFICE
CERTIFICATE OF CORRECTION

PATENT NO. : 7,616,794 B2  Page 1 of 1
APPLICATION NO. : 11/036439
DATED : November 10, 2009
INVENTOR(S) : Thomas Moeller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 854 days.

Signed and Sealed this

Nineteenth Day of October, 2010

David J. Kappos
*Director of the United States Patent and Trademark Office*